US010921939B2

(12) United States Patent
Tanaka et al.

(10) Patent No.: US 10,921,939 B2
(45) Date of Patent: Feb. 16, 2021

(54) DEVICE AND METHOD FOR CAPACITIVE SENSING WITH NOISE MITIGATION

(71) Applicant: SYNAPTICS INCORPORATED, San Jose, CA (US)

(72) Inventors: Nobukazu Tanaka, Tokyo (JP); Takayuki Noto, Tokyo (JP); Tetsuo Tanemura, Tokyo (JP)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 16/446,295

(22) Filed: Jun. 19, 2019

(65) Prior Publication Data

US 2020/0042119 A1 Feb. 6, 2020

(30) Foreign Application Priority Data

Jun. 28, 2018 (JP) .............................. JP2018-122752

(51) Int. Cl.
*G06F 3/044* (2006.01)
*G06F 3/041* (2006.01)

(52) U.S. Cl.
CPC .......... *G06F 3/044* (2013.01); *G06F 3/04166* (2019.05); *G06F 2203/04101* (2013.01); *G06F 2203/04108* (2013.01)

(58) Field of Classification Search
CPC ................. G06F 3/04166; G06F 3/044; G06F 2203/04101; G06F 2203/04108
See application file for complete search history.

(56) References Cited

U.S. PATENT DOCUMENTS

| 2014/0320450 A1* | 10/2014 | Lee .......................... G06F 3/044 345/174 |
| 2016/0188085 A1* | 6/2016 | Leigh ...................... G06F 3/041 345/174 |
| 2016/0190987 A1 | 6/2016 | Bohannon et al. |
| 2018/0113534 A1 | 4/2018 | Tanaka et al. |

FOREIGN PATENT DOCUMENTS

| JP | 2018072928 A | 5/2018 |
| KR | 10-2018-0018983 A | 2/2018 |
| KR | 10-2018-0062582 A | 6/2018 |

OTHER PUBLICATIONS

Interanational Search Report and Written Opinion, Application No. PCT/US2019/038004 dated Nov. 28, 2019 consists of 12 pages.

* cited by examiner

*Primary Examiner* — Laurence J Lee
(74) *Attorney, Agent, or Firm* — Leydig, Voit & Mayer, Ltd.

(57) ABSTRACT

A semiconductor device comprises first mixer circuitry and processing circuitry. The first mixer circuitry is configured to generate a plurality of first mixer outputs through quadrature decomposition of a sensing signal. The first sensing signal corresponds to a capacitance of a first sensing electrode supplied with a drive signal. The quadrature decomposition is based on an in-phase local carrier which is in phase with the drive signal and an out-of-phase local carrier having a phase different from that of the in-phase local carrier. The plurality of first mixer outputs comprises an in-phase mixer output generated based on the in-phase local carrier and the sensing signal, and an out-of-phase mixer output generated based on the out-of-phase local carrier and the sensing signal.

20 Claims, 5 Drawing Sheets

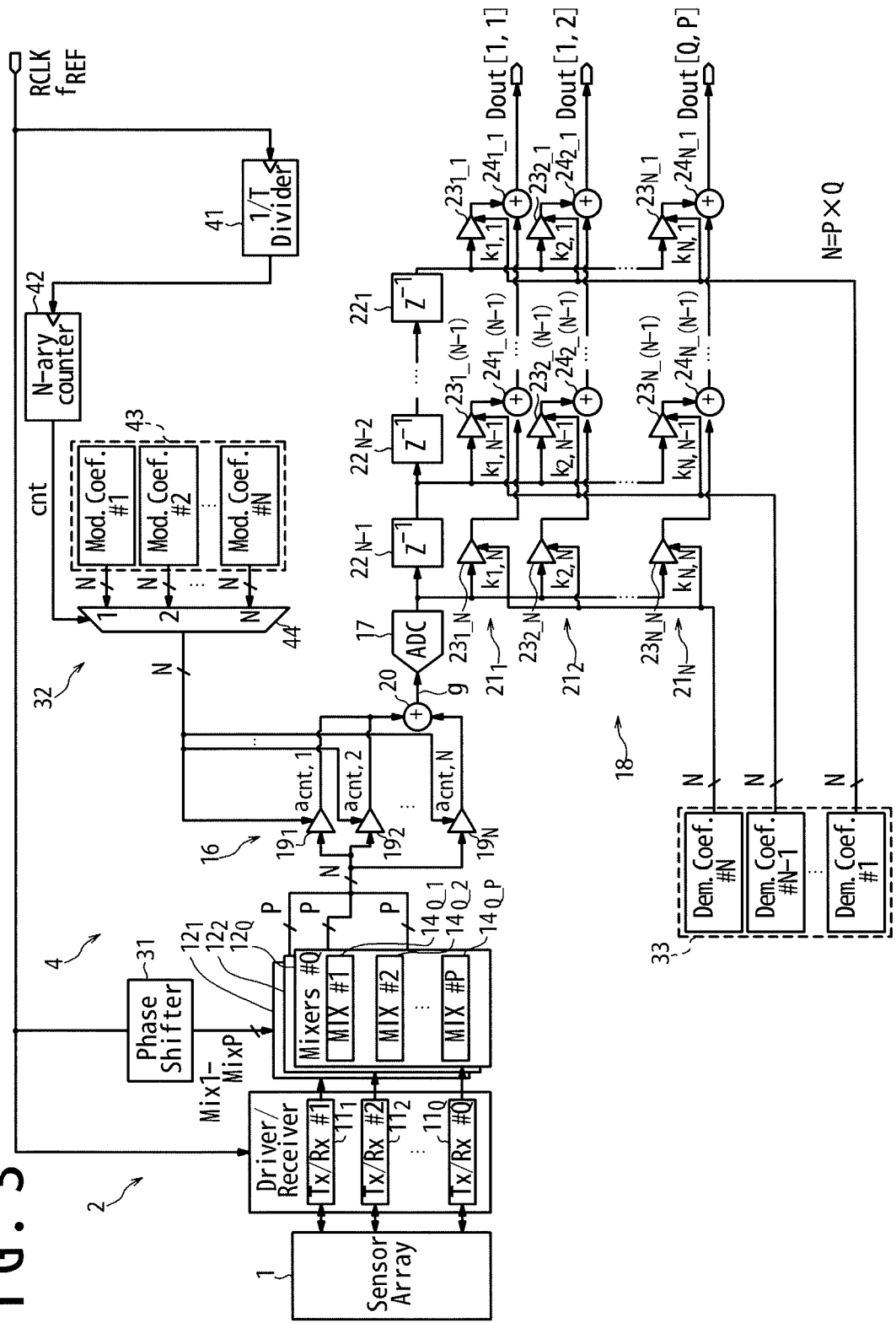
F I G. 3

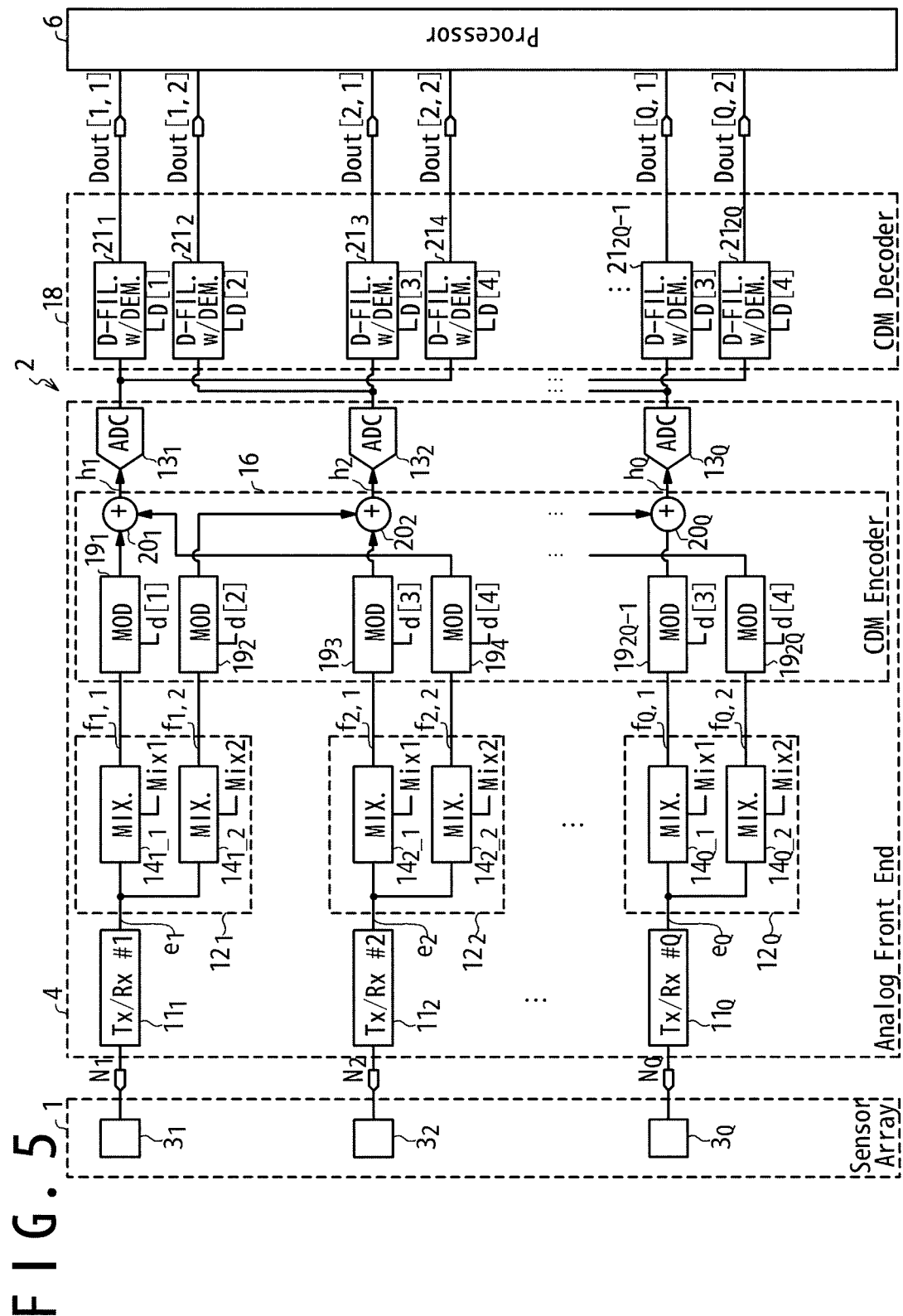
F I G. 5

DEVICE AND METHOD FOR CAPACITIVE SENSING WITH NOISE MITIGATION

CROSS REFERENCE

This application claims priority to Japanese Patent Application No. 2018-122752, filed on Jun. 28, 2018, the disclosure of which is incorporated herein by reference in its entirety.

BACKGROUND

Field

The present disclosure is related to a device and method for capacitive sensing.

Description of the Related Art

Capacitive sensing is used for proximity sensing which may involve sensing an approach or contact of an object such as a user's finger and a stylus to an input device such as a touch panel. Capacitive sensing may experience noise on a sensing signal obtained from a sensing electrode, and a system adapted to capacitive sensing may be designed to address effects of the noise.

SUMMARY

In one or more embodiments, a semiconductor device comprises first mixer circuitry and processing circuitry. The first mixer circuitry is configured to generate a plurality of first mixer outputs through quadrature decomposition of a first sensing signal. The first sensing signal corresponds to a capacitance of a first sensing electrode supplied with a drive signal. The quadrature decomposition is based on an in-phase local carrier which is in phase with the drive signal and an out-of-phase local carrier which has a phase different from that of the in-phase local carrier. The plurality of first mixer outputs comprises a first in-phase mixer output and a first out-of-phase mixer output. The first in-phase mixer output is generated based on the in-phase local carrier and the first sensing signal. The first out-of-phase mixer output is generated based on the out-of-phase local carrier and the first sensing signal. The processing circuitry is configured to perform proximity sensing of an object based on the first in-phase mixer output and noise sensing based on the first out-of-phase mixer output.

In one or more embodiments, a capacitive sensing system comprises a sensor array comprising a first sensing electrode; first mixer circuitry; and processing circuitry. The first mixer circuitry is configured to generate a plurality of first mixer outputs through quadrature decomposition of a first sensing signal. The first sensing signal corresponds to a capacitance of the first sensing electrode supplied with a drive signal. The quadrature decomposition is based on an in-phase local carrier which is in phase with the drive signal and an out-of-phase local carrier which has a phase different from that of the in-phase local carrier. The plurality of first mixer outputs comprises a first in-phase mixer output and a first out-of-phase mixer output. The first in-phase mixer output is generated based on the in-phase local carrier and the first sensing signal. The first out-of-phase mixer output is generated based on the out-of-phase local carrier and the first sensing signal. The processing circuitry is configured to perform proximity sensing of an object based on the first in-phase mixer output and noise sensing based on the first out-of-phase mixer output.

In one or more embodiments, a method comprises generating a plurality of first mixer outputs through quadrature decomposition of a first sensing signal. The first sensing signal corresponds to a capacitance of a first sensing electrode supplied with a drive signal. The quadrature decomposition is based on an in-phase local carrier which is in phase with the drive signal and an out-of-phase local carrier which has a phase different from that of the in-phase local carrier. The plurality of first mixer outputs comprises a first in-phase mixer output and a first out-of-phase miser output. The first in-phase mixer output is obtained based on the in-phase local carrier and the first sensing signal. The first out-of-phase mixer output is obtained based on the out-of-phase local carrier and the first sensing signal. The method further comprises performing proximity sensing of an object based on the first in-phase mixer output. The method further comprises performing noise sensing based on the first out-of-phase mixer output.

BRIEF DESCRIPTION OF THE DRAWINGS

So that the manner in which the above recited features of the present disclosure may be understood in detail, a more particular description of the disclosure, briefly summarized above, may be had by reference to embodiments, some of which are illustrated in the appended drawings. It is to be noted, however, that the appended drawings illustrate only some embodiments of this disclosure and are therefore not to be considered limiting of its scope, for the disclosure may admit to other equally effective embodiments.

FIG. 3 illustrates one example circuit configuration of a capacitive sensing system, according to one or more embodiments.

FIG. 5 illustrates one example configuration of a capacitive sensing system, according to one or more embodiments.

DETAILED DESCRIPTION

Figure 1:
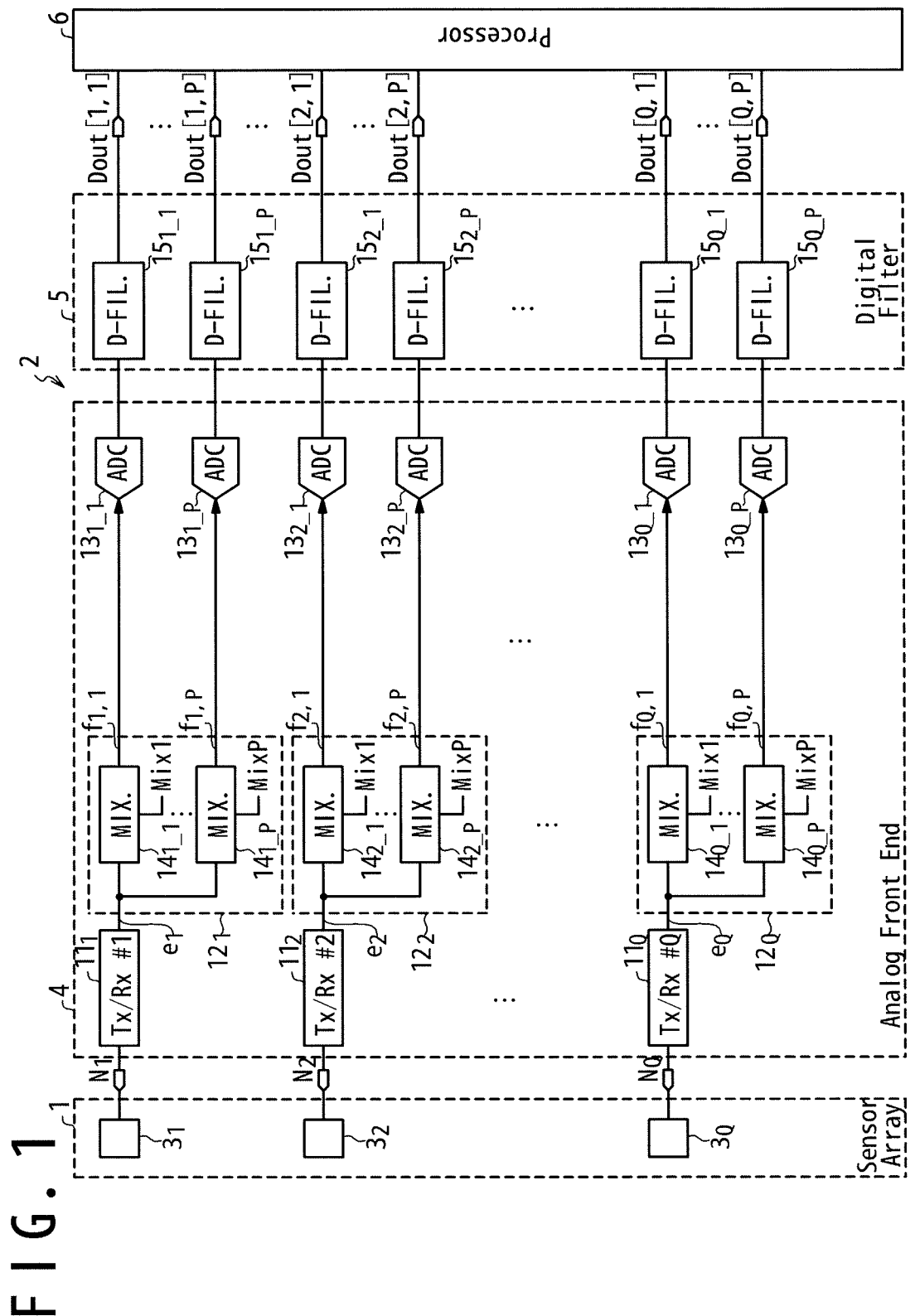
FIG. 1 illustrates one example configuration of a capacitive sensing system, according to one or more embodiments.

A description is given below of embodiments of the present disclosure with reference to the attached drawings. In the following, same or similar components may be denoted by same or corresponding reference numerals. Suffixes may be attached to reference numerals to distinguish same components from each other.

In one or more embodiments, as illustrated in FIG. 1, a capacitive sensing system comprises a sensor array 1 and a semiconductor device 2. In one or more embodiments, the capacitive sensing system is adapted to self-capacitive sensing for the sensor array 1. In one or more embodiments, the sensor array 1 comprises a plurality of sensing electrodes 3 and the capacitive sensing is achieved based on the self-capacitances of the sensing electrodes 3. In one or more embodiments, the sensor array 1 comprises Q sensing electrodes $3_1$ to $3_Q$, which are connected to nodes $N_1$ to $N_Q$, respectively, where Q is an integer of two or more.

In one or more embodiments, the sensor array 1 may be integrated in a touch panel. In alternative embodiments, the sensor array 1 may be integrated in a display panel. As for a liquid crystal display panel comprising a plurality of common electrodes arrayed in rows and columns, the common electrodes may be used as the sensing electrodes 3 of the sensor array 1 in one or more embodiments.

In one or more embodiments, the semiconductor device 2 comprises an analog front end 4, digital filter circuitry 5, and a processor 6.

In one or more embodiments, the analog front end 4 comprises Q driver/receivers $11_1$ to $11_Q$, Q mixer circuitries $12_1$ to $12_Q$, and P×Q analog-digital (AD) converters $13_{1\_1}$ to $13_{Q\_P}$, where P is an integer of two or more.

In one or more embodiments, the driver/receivers $11_1$ to $11_Q$ are configured to supply drive signals to the sensing electrodes $3_1$ to $3_Q$, respectively, and output sensing signals $e_1$ to $e_Q$ corresponding to charging and discharging currents of the sensing electrodes $3_1$ to $3_Q$ which are generated when the drive signals are supplied to the sensing electrodes $3_1$ to $3_Q$. In one or more embodiments, the charging and discharging currents of the sensing electrodes $3_1$ to $3_Q$ depend on the self-capacitances of the sensing electrodes $3_1$ to $3_Q$, and the sensing signals $e_1$ to $e_Q$ comprise information of the self-capacitances of the sensing electrodes $3_1$ to $3_Q$. In one or more embodiments, the sensing signals $e_1$ to $e_Q$ may be generated as current signals having current levels corresponding to the charging and discharging currents of the sensing electrodes $3_1$ to $3_Q$.

In one or more embodiments, periodic signals of a frequency $f_{REF}$ are used as the drive signals supplied to the sensing electrodes $3_1$ to $3_Q$. In such an embodiment, the sensing signals $e_1$ to $e_Q$ are obtained as signals into which the information of the self-capacitances of the sensing electrodes $3_1$ to $3_Q$ is modulated with the periodic signals of the frequency $f_{REF}$. Signals of various waveforms may be used as the drive signals. For example, signals of sinusoidal waveform, triangular waveform, and rectangular waveform may be used as the drive signals.

In one or more embodiments, the mixer circuitries $12_1$ to $12_Q$ are connected to the driver/receivers $11_1$ to $11_Q$, respectively, and configured to achieve quadrature decomposition of the sensing signals $e_1$ to $e_Q$ received from the driver/receivers $11_1$ to $11_Q$. In one or more embodiments, each mixer circuitry $12_i$ comprises P mixers $14_{i\_1}$ to $14_{i\_P}$, which are respectively supplied with local carriers Mix1 to MixP of the same frequency $f_{REF}$ as that of the drive signals. In one or more embodiments, the mixers $14_{i\_1}$ to $14_{i\_P}$ are configured to generate P mixer outputs $f_{i,1}$ to $f_{i,P}$ by multiplying the sensing signal $e_i$ by the local carriers Mix1 to MixP, which are orthogonal to each other, where i is any integer from one to Q. In one or more embodiments, the outputs of the mixer circuitries $12_1$ to $12_Q$ are connected to processing circuitry configured to perform signal processing for capacitive sensing on the mixer outputs $f_{1,1}$ to $f_{Q,P}$.

In one or more embodiments, the local carrier Mix1 supplied to the mixer $14_{i\_1}$ is an in-phase signal which is in phase with the drive signal supplied to the sensing electrode $3_i$ from the driver/receiver $11_i$. In one or more embodiments, the local carrier Mix1 supplied to the mixer $14_{i\_1}$ is in phase with the drive current waveform. In one or more embodiments, the remaining local carriers Mix2 to MixP supplied to the mixers $14_{i\_2}$ to $14_{i\_P}$ are out-of-phase signals which have phases different from that of the local carrier Mix1. In one or more embodiments, the mixer output $f_{i,1}$ incorporates information of an effective signal component, and the remaining mixer outputs $f_{i,2}$ to $f_{i,P}$ incorporate information of noise components.

When the sensing signals $e_1$ to $e_Q$ outputted from the driver/receivers $11_1$ to $11_Q$ are current signals, each of the mixers $14_{1\_1}$ to $14_{Q\_P}$ may comprise current mirror circuitry (or current conveyer circuitry) to reproduce the sensing signal received thereby. This configuration may allow each driver/receiver $11_i$ to stably supply the sensing signal $e_i$ of a reduced signal level to multiple mixers 14.

In one or more embodiments, the AD converters $13_{1\_1}$ to $13_{Q\_P}$ are configured to perform AD conversion on the mixer outputs $f_{1,1}$ to $f_{Q,P}$ received from the mixers $14_{1\_1}$ to $14_{Q\_P}$.

In one or more embodiments, the digital filter circuitry 5 comprises P×Q digital filters $15_{1\_1}$ to $15_{Q\_P}$. The digital filters $15_{1\_1}$ to $15_{Q\_P}$ are configured to generate digital output signals Dout [1, 1] to Dout [Q, P] by performing digital filtering on digital data streams received from the AD converters $13_{1\_1}$ to $13_{Q\_P}$ to extract desired frequency components.

The processor 6 is configured to perform arithmetic processing on the digital output signals Dout [1, 1] to Dout [Q, P] for proximity sensing of an object, such as a user's finger and a stylus, to the sensor array 1. This arithmetic processing may involve sensing a position at which the object approaches or is in contact with the sensor array 1.

In one or more embodiments, the digital output signal Dout [i, 1] of the P digital output signals Dout [i, 1] to [i, P], which are obtained from the sensing signal $e_i$ associated with each sensing electrode $3_i$, is obtained through performing AD conversion and digital filtering on the mixer output $f_{i,1}$ generated by using the local carrier Mix1, which is in phase with the corresponding drive signal, and accordingly the digital output signal Dout [i, 1] incorporates information of an effective signal component for proximity sensing.

In one or more embodiments, the remaining digital output signals Dout [i, 2] to Dout [i, P] are obtained through performing AD conversion and digital filtering on the mixer outputs $f_{i,2}$ to $f_{i,P}$ generated by using the local carriers Mix2 to MixP, which are out of phase with the corresponding drive signal, and accordingly the digital output signals Dout [i, 2] to [i, P] incorporate information of noise components. If there is no noise, the signal levels of the digital output signals Dout [i, 2] to [i, P] are expected to be zero. When the signal levels of the digital output signals Dout [i, 2] to Dout [i, P] are not zero, this may imply existence of noise on the sensing signal $e_i$.

In one or more embodiments, the processor 6 is configured to perform proximity sensing to detect an object proximate to the sensor array 1 based on the digital output signals Dout [1, 1] to Dout [Q, 1], which correspond to the effective signal components. In one or more embodiments, the processor 6 may sense the position at which an object approaches or is in contact with the sensor array 1, based on the digital output signals Dout [1, 1] to Dout [Q, 1].

In one or more embodiments, the processor 6 additionally performs noise sensing based on the digital output signals associated with noise components, that is, those of the digital output signals Dout [1, 1] to Dout [Q, P] other than the digital output signals Dout [1, 1] to Dout [Q, 1]. In one or more embodiments, data associated with the digital output signal Dout [i, 1] obtained for a certain frame may be discarded when noise is sensed in capacitive sensing in that frame based on the digital output signals Dout [i, 2] to Dout [i, P]. In this case, detection of an object may be achieved based on the digital output signal Dout [1, 1] to Dout [Q, 1] for which no noise is sensed.

In one or more embodiments, this operation may achieve noise sensing as well as obtainment of the effective signal components in the capacitive sensing.

The number of the mixers 14 included in each mixer circuitry $12_i$ may depend on the information amount of noise components to be obtained. The number of the mixers 14 may be reduced when only existence and absence of noise is to be sensed, because only a reduced amount of information is to be obtained concerning noise components. In one or more embodiments, the number P of the mixers 14 included in each mixer circuitry $12_i$ is two. When P is two, the phase of the local carrier Mix2 may be shifted by 90° from that of the local carrier Mix1 in one or more embodiments.

Figure 2:
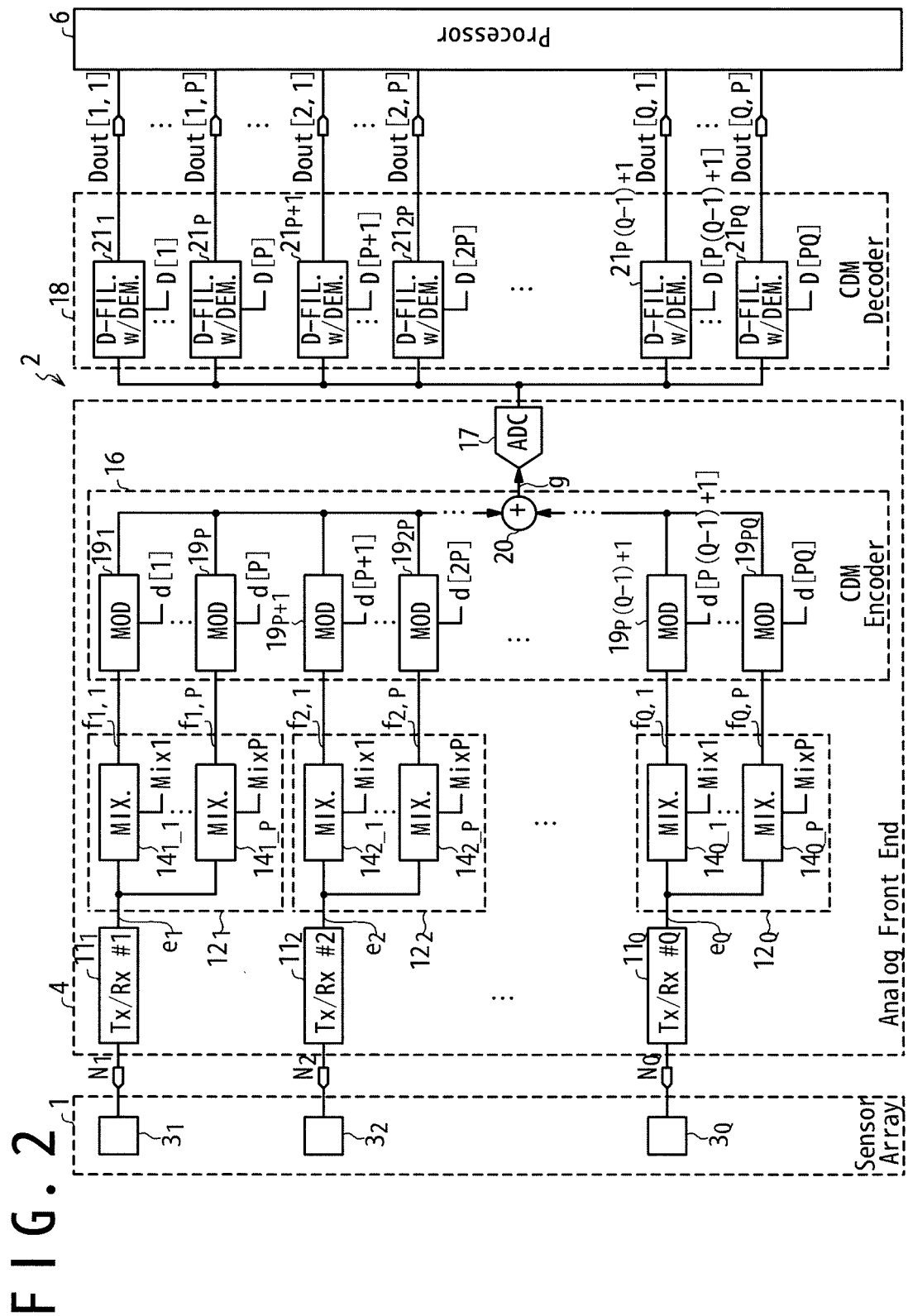
FIG. 2 illustrates one example configuration of a capacitive sensing system, according to one or more embodiments.

In one or more embodiments, as illustrated in FIG. 2, the analog front end 4 comprises a code division multiplexing (CDM) encoder 16 and an AD converter 17. In one or more embodiments, the semiconductor device 2 further comprises a CDM decoder 18.

In one or more embodiments, the CDM encoder 16 is configured to generate a CDM signal g by performing CDM on the mixer outputs $f_{1,1}$ to $f_{Q,P}$ received from the mixer circuitries $12_1$ to $12_Q$. In one or more embodiments, the CDM encoder 16 comprises P×Q modulators $19_1$ to $19_{PQ}$ and a superimposer 20. In one or more embodiments, the modulators $19_1$ to $19_{PQ}$ are configured to modulate the mixer outputs $f_{1,1}$ to $f_{Q,P}$ with codes d[1] to d[PQ], respectively. In one or more embodiments, the mixer output $f_{i,k}$ is supplied to the modulator $19_{(i-1) \times P+k}$ and modulated with the code d[(i−1)×P+k], where i is any integer from one to Q, and k is any integer from one to P. In one or more embodiments, the codes d[1] to d[PQ] are orthogonal to each other. In one or more embodiments, the superimposer 20 is configured to generate the CDM signal g by adding the output signals of the modulators $19_1$ to $19_{PQ}$. When the output signals of the modulators $19_1$ to $19_{PQ}$ are current signals, the addition of the output signals may be achieved through wired-OR. In this case, the outputs of the modulators $19_1$ to $19_{PQ}$ may be commonly connected to an input of the AD converter 17.

In one or more embodiments, the AD converter 17 is configured to output a digital data stream by performing AD conversion on the CDM signal g received from the superimposer 20.

In one or more embodiments, the CDM decoder 18 is configured to decode the digital data stream received from the AD converter 17. In one or more embodiments, the CDM decoder 18 comprises digital filters $21_1$ to $21_{PQ}$ adapted to demodulation. In one or more embodiments, the digital filters $21_1$ to $21_{PQ}$ respectively receive codes D[1] to D[PQ] corresponding to the codes d[1] to d[PQ], which are used for the modulation. In one or more embodiments, the digital filters $21_1$ to $21_{PQ}$ are configured to generate the digital output signals Dout [1, 1] to Dout [Q, P] by decoding the digital data stream received from the AD converter 17 by using the codes D[1] to D[PQ], respectively.

In one or more embodiments, the processor 6 is configured to perform arithmetic processing to perform proximity sensing to detect an object proximate to the sensor array 1 on the digital output signals Dout [1, 1] to Dout [Q, P] received from the CDM decoder 18. In one or more embodiments, the digital output signals Dout [1, 1] to Dout [Q, P] generated in the semiconductor device 2 illustrated in FIG. 2 are equivalent to those generated in the semiconductor device 2 illustrated in FIG. 1, except for distortion caused by the CDM. In one or more embodiments, the arithmetic processing for the proximity sensing is achieved by the semiconductor device 2 illustrated in FIG. 2 in a similar way to the semiconductor device 2 illustrated in FIG. 1.

In one or more embodiments, the capacitive sensing system illustrated in FIG. 2 achieves noise sensing as well as obtainment of the effective signal component. In one or more embodiments, the capacitive sensing system illustrated in FIG. 2 additionally allows reducing the number of AD converters compared with that illustrated in FIG. 1. This may effectively reduce the chip size and cost of the semiconductor device 2.

In one or more embodiments, as illustrated in FIG. 3, the analog front end 4 comprises a phase shifter 31 and modulation coefficient supply circuitry 32, and the CDM decoder 18 comprises demodulation coefficient supply circuitry 33. In FIG. 3 and the explanation thereof, N represents the product of P and Q, that is, N=P×Q.

In one or more embodiments, the phase shifter 31 is configured to generate the local carriers Mix1 to MixP based on a reference clock RCLK of the frequency $f_{REF}$ and supply the local carriers Mix1 to MixP to the mixer circuitries $12_1$ to $12_Q$. In one or more embodiments, the reference clock RCLK is also applied to the driver/receivers $11_1$ to $11_Q$ and used for generating the drive signals. In one or more embodiments, the drive signals also have the frequency $f_{REF}$.

In one or more embodiments, the modulation coefficient supply circuitry 32 is configured to supply modulation coefficients to the modulators $19_1$ to $19_N$. The modulation coefficients supplied to each modulator $19_i$ from the modulation coefficient supply circuitry 32 form the code d[i] illustrated in FIG. 2.

In one or more embodiments, the modulation coefficient supply circuitry 32 comprises a frequency divider 41, an N-ary counter 42, storage circuitry 43 and a selector 44.

In one or more embodiments, the frequency divider 41 is configured to generate a frequency-divided clock signal comprising one clock pulse for every calculation cycle of the CDM encoder 16 and the CDM decoder 18 by performing frequency-dividing on the reference clock RCLK. In one or more embodiments, the N-ary counter 42 is configured to count clock pulses of the frequency-divided clock signal received from the frequency divider 41 to output a count value cnt.

In one or more embodiments, the storage circuitry 43 is configured to store therein the modulation coefficients #1 to #N. In one or more embodiments, the modulation coefficients #p comprise a set of modulation coefficients supplied to the modulators $19_1$ to $19_N$ in the p-th cycle of the calculation performed in the CDM encoder 16, where p is an integer from one to N (=P×Q). In one or more embodiments, the modulation coefficients #p comprise modulation coefficients $a_{p,1}$ to $a_{p,N}$ supplied to the modulators $19_1$ to $19_N$, respectively.

In one or more embodiments, the selector 44 is configured to select modulation coefficients to be supplied to the modulators $19_1$ to $19_N$ in each cycle from among the modulation coefficients #1 to #N stored in the storage circuitry 43, based on the count value cnt supplied from the N-ary counter 42. In one or more embodiments, the count value cnt is one in the first cycle, and the selector 44 accordingly supplies the modulation coefficients $a_{1,1}$ to $a_{1,N}$ included in the modulation coefficients #1 to the modulators $19_1$ to $19_N$. In one or more embodiment, similarly for N from two to N; the count value cnt is p in the p-th cycle, and the selector 44 accordingly supplies the modulation coefficients $a_{p,1}$ to $a_{p,N}$ included in the modulation coefficients #p to the modulators $19_1$ to $19_N$.

In one or more embodiments, the modulators $19_1$ to $19_N$ of the CDM encoder 16 are configured as multipliers which multiply the mixer outputs $f_{1,1}$ to $f_{Q,P}$ received from the mixer circuitries $12_1$ to $12_Q$ by the modulation coefficients successively received from the modulation coefficient supply circuitry 32. In one or more embodiments, the superimposer 20 is configured to add up the output signals of the modulators $19_1$ to $19_N$ to generate the CDM signal g.

In one or more embodiments, the demodulation coefficient supply circuitry 33 is configured to store demodulation coefficients #1 to #N to be supplied to the CDM decoder 18. In one or more embodiments, the demodulation coefficients #p comprises demodulation coefficients $k_{p,1}$ to $k_{p,N}$. In one or more embodiments, the demodulation coefficients supplied to each digital filter $21_i$ of the CDM decoder 18 from the demodulation coefficient supply circuitry 33 form the code D[i] illustrated in FIG. 2.

In one or more embodiments, the CDM decoder 18 comprises, in addition to the digital filters $21_1$ to $21_N$, delay circuitries $22_1$ to $22_{N-1}$ configured to successively delay the digital data stream received from the AD convert 17. The delay circuitry $22_{N-1}$ is configured to delay the data outputted from the AD converter 17 by one cycle. The delay circuitry $22_{N-2}$ is configured to delay the data outputted from the delay circuitry $22_{N-1}$ by one cycle. A similar applies to the rest. The delay circuitry $22_i$ is configured to delay the data outputted from the delay circuitry $22_{i-1}$ by one cycle, where i is an integer from one to N−2.

In one or more embodiments, the digital filters $21_1$ to $21_N$ of the CDM decoder 18 form product-sum calculation circuitry configured to perform product-sum calculation of the demodulation coefficients received from the demodulation coefficient supply circuitry 33 and the data received from the AD converter 17 and the delay circuitries $22_1$ to $22_{N-1}$. In one or more embodiments, each digital filter $21_i$ comprises multipliers $23_{i\_1}$ to $23_{i\_N}$ and adders $24_{i\_1}$ to $24_{i\_(N-1)}$.

In one or more embodiments, the multipliers $23_{i\_1}$ to $23_{i\_(N-1)}$ of each digital filter $21_i$ are configured to output the products obtained by multiplying the digital values outputted from the delay circuitries $22_1$ to $22_{N-1}$ by the demodulation coefficients $k_{i,1}$ to $k_{i,N-1}$, respectively. In one or more embodiments, the multiplier $23_{i\_N}$ is configured to output the product obtained by multiplying the digital value outputted from the AD converter 17 by the demodulation coefficient $k_{i,N}$.

In one or more embodiments, the adders $24_{i\_1}$ to $24_{i\_(N-1)}$ are serially connected and used to calculate the sum of the digital values outputted from the multipliers $23_{i\_1}$ to $23_{i\_N}$. In one or more embodiments, the adder $24_{i\_(N-1)}$ is configured to output the sum of the digital values outputted from the multipliers $23_{i\_(N-1)}$ and $23_{i\_N}$. In one or more embodiments, the adder $24_{i\_(N-2)}$ is configured to output the sum of the digital value outputted from the adder $24_{i\_(N-1)}$ and the digital value outputted from the multiplier $23_{i\_(N-1)}$. In one or more embodiments, a similar applies to the rest; the adder $24_{i\_(k+1)}$ is configured to output the sum of the digital value outputted from the adder $24_{i\_k}$ and the digital value outputted from the multiplier $23_{i\_k}$, where k is an integer from one to N−1. In one or more embodiments, the digital value outputted from the adder $24_{i\_1}$ is the sum of the digital values outputted from the multipliers $23_{i\_1}$ to $23_{i\_N}$.

Capacitive sensing is achieved by the circuit configuration illustrated in FIG. 3 as follows. In the following description, for easiness of understanding of the calculations performed in the N modulators $19_1$ to $19_N$, the mixer output $f_{i,k}$ supplied to the modulator $19_{(i-1)\times P+k}$ may be referred to as the mixer output $f_{(i-1)\times P+k}$, where i is any integer from one to Q and k is any integer from one to P. For example, the mixer outputs $f_{1,1}$ to $f_{1,P}$ supplied to the modulators $19_1$ to $19_P$ may be referred to as mixer outputs $f_1$ to $f_P$, and the mixer outputs $f_{2,1}$~$f_{2,P}$ supplied to the modulators $19_{P+1}$ to $19_{2P}$ may be referred to as mixer outputs $f_{P+1}$ to $f_{2P}$. In this notation, the modulators $19_1$ to $19_N$ receive the mixer outputs $f_1$ to $f_N$, respectively.

In one or more embodiments, the driver/receivers $11_1$ to $11_Q$ output drive signals of the same waveform over N cycles in one capacitive sensing procedure. In the following, the N cycles of the capacitive sensing procedure may be referred to as first to N-th cycles, respectively.

In one or more embodiments, the waveform of the drive signal supplied to the sensing electrode $3_i$ remains unchanged over the first to N-th cycles. In such an embodiment, the waveform of the sensing signal $e_i$ is expected to remain unchanged over the first to N-th cycles, and accordingly the waveforms of the mixer outputs $f_1$ to $f_N$ outputted from the mixer circuitries $12_1$ to $12_Q$ are also expected to remain unchanged over the first to N-th cycles. In one or more embodiments, the following expressions (1) hold:

$$f_1(t)= \ldots =f_1(t+(N-1)T),$$

$$f_2(t)=f_2(t+T)= \ldots =f_2(t+(N-1)T),$$

$$f_N(t)=f_N(t+T)= \ldots =f_N(t+(N-1)T), \quad (1)$$

where t, t+T, ... and t+(N−1)T are the times at which the AD converter 17 samples the input signal thereof in the first to N-th cycles, respectively, and $f_1(t)$ to $f_N(t)$ are signal levels of the mixer outputs $f_1$ to $f_N$ at the time t, respectively. For notational simplicity, the signal levels of the mixer outputs $f_1$ to $f_N$ at the times t, t+T, ... and t+(N−1)T may be simply denoted by $f_1$ to $f_N$.

In one or more embodiments, the calculation performed in the CDM encoder 16 in the first to N-th cycles can be represented by an N×N modulation matrix having elements $a_{1,1}$ to $a_{N,N}$. In one or more embodiments, the signal levels $g_1$ to $g_N$ of the CDM signal g in the first to N-th cycles are represented by the following expression (2):

$$\begin{pmatrix} g_1 \\ g_2 \\ \vdots \\ g_N \end{pmatrix} = \begin{pmatrix} a_{1,1} & a_{1,2} & \ldots & a_{1,N} \\ a_{2,1} & a_{2,2} & \ldots & a_{2,N} \\ \vdots & \vdots & \ddots & \vdots \\ a_{N,1} & a_{N,2} & \ldots & a_{N,N} \end{pmatrix} \begin{pmatrix} f_1 \\ f_2 \\ \vdots \\ f_N \end{pmatrix}. \quad (2)$$

In one or more embodiments, the AD converter 17 performs AD conversion on the input signal thereof in the first to N cycles and outputs digital values $s_1$ to $s_N$ in the first to N cycles, respectively. In one or more embodiments, the digital values $s_1$ to $s_N$ are represented by the following expression (3):

$$\begin{pmatrix} s_1 \\ s_2 \\ \vdots \\ s_N \end{pmatrix} = \begin{pmatrix} g_1 \\ g_2 \\ \vdots \\ g_N \end{pmatrix} = \begin{pmatrix} a_{1,1} & a_{1,2} & \ldots & a_{1,N} \\ a_{2,1} & a_{2,2} & \ldots & a_{2,N} \\ \vdots & \vdots & \ddots & \vdots \\ a_{N,1} & a_{N,2} & \ldots & a_{N,N} \end{pmatrix} \begin{pmatrix} f_1 \\ f_2 \\ \vdots \\ f_N \end{pmatrix}. \quad (3)$$

In one or more embodiments, the calculation performed by the CDM decoder 18 on the digital values $s_1$ to $s_N$ outputted from the AD converter 17 in the first to N-th cycles can be represented by an N×N demodulation matrix having elements $k_{1,1}$ to $k_{N,N}$. In one or more embodiments, the outputs $d_1$ to $d_N$ of the digital filters $21_1$ to $21_N$ of the CDM decoder 18 are represented by the following expression (4):

$$\begin{pmatrix} d_1 \\ d_2 \\ \vdots \\ d_N \end{pmatrix} = \begin{pmatrix} k_{1,1} & k_{1,2} & \cdots & k_{1,N} \\ k_{2,1} & k_{2,2} & \cdots & k_{2,N} \\ \vdots & \vdots & \ddots & \vdots \\ k_{N,1} & k_{N,2} & \cdots & k_{N,N} \end{pmatrix} \begin{pmatrix} s_1 \\ s_2 \\ \vdots \\ s_N \end{pmatrix} = \quad (4)$$

$$\begin{pmatrix} k_{1,1} & k_{1,2} & \cdots & k_{1,N} \\ k_{2,1} & k_{2,2} & \cdots & k_{2,N} \\ \vdots & \vdots & \ddots & \vdots \\ k_{N,1} & k_{N,2} & \cdots & k_{N,N} \end{pmatrix} \begin{pmatrix} a_{1,1} & a_{1,2} & \cdots & a_{1,N} \\ a_{2,1} & a_{2,2} & \cdots & a_{2,N} \\ \vdots & \vdots & \ddots & \vdots \\ a_{N,1} & a_{N,2} & \cdots & a_{N,N} \end{pmatrix} \begin{pmatrix} f_1 \\ f_2 \\ \vdots \\ f_N \end{pmatrix}.$$

In one or more embodiments, the modulation coefficients $a_{1,1}$ to $a_{N,N}$ and the demodulation coefficients $k_{1,1}$ to $k_{N,N}$ are selected so that the modulation matrix and the demodulation matrix are orthogonal to each other, that is, the product of the modulation matrix and the demodulation matrix is an identity matrix as represented by the expression (5), and thereby values representing the signal levels of the mixer outputs $f_1$ to $f_N$ are obtained as the outputs $d_1$ to $d_N$ of the digital filters $21_1$ to $21_N$:

$$\begin{pmatrix} k_{1,1} & k_{1,2} & \cdots & k_{1,N} \\ k_{2,1} & k_{2,2} & \cdots & k_{2,N} \\ \vdots & \vdots & \ddots & \vdots \\ k_{N,1} & k_{N,2} & \cdots & k_{N,N} \end{pmatrix} \begin{pmatrix} a_{1,1} & a_{1,2} & \cdots & a_{1,N} \\ a_{2,1} & a_{2,2} & \cdots & a_{2,N} \\ \vdots & \vdots & \ddots & \vdots \\ a_{N,1} & a_{N,2} & \cdots & a_{N,N} \end{pmatrix} = \begin{pmatrix} 1 & 0 & \cdots & 0 \\ 0 & 1 & \cdots & 0 \\ \vdots & \vdots & \ddots & \vdots \\ 0 & 0 & \cdots & 1 \end{pmatrix}. \quad (5)$$

In one or more embodiments, the digital output signal Dout [i, k] supplied to the processor 6 are obtained as the output $d_{(i-1)\times P+k}$ of the digital filter $21_{(i-1)\times P+k}$. In one or more embodiments, the processor 6 performs calculation for capacitive sensing based on the digital output signal Dout [1, 1] to Dout [Q, P] thus obtained.

Figure 4:
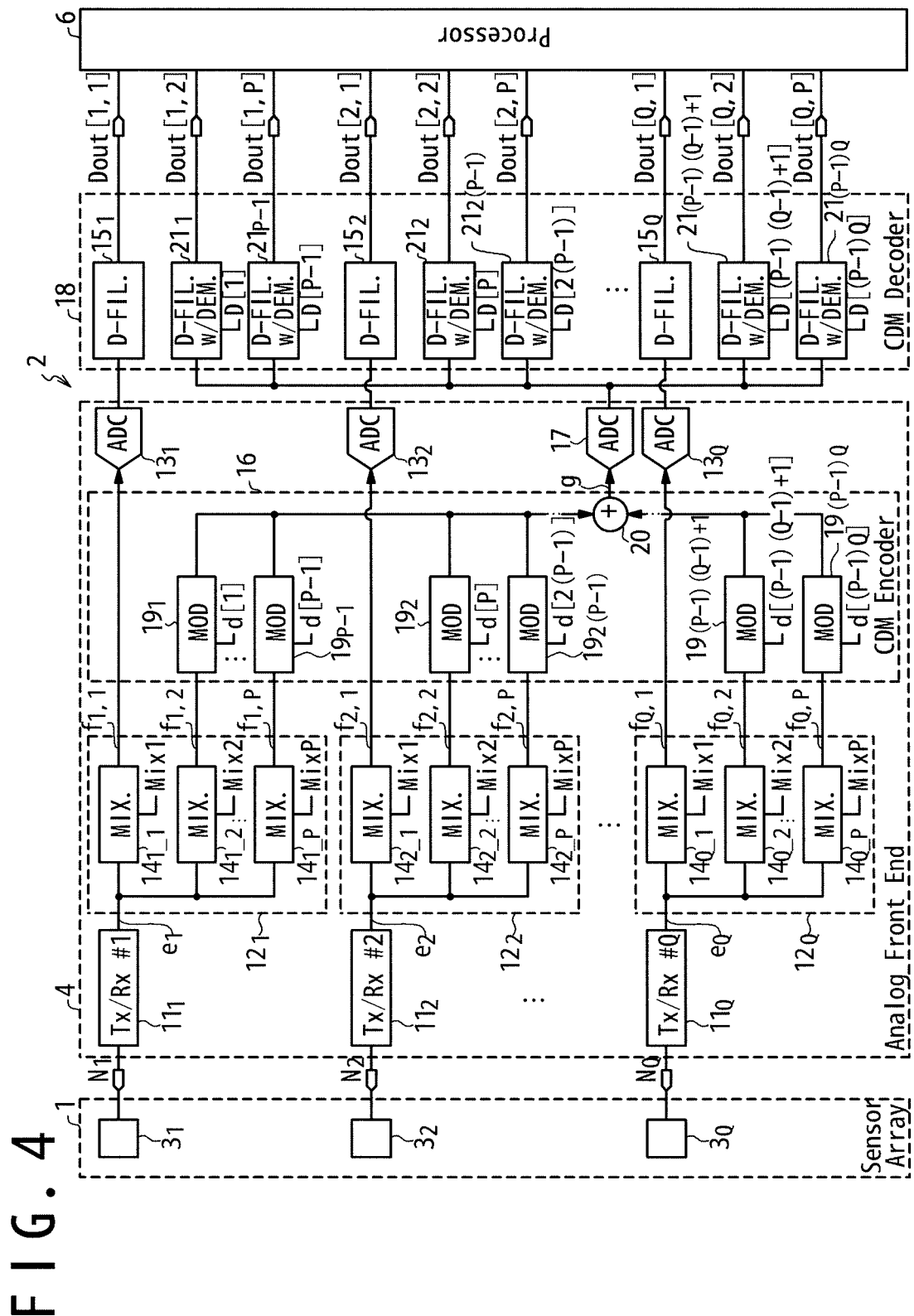
FIG. 4 illustrates one example configuration of a capacitive, according to one or more embodiments.

In one or more embodiments, as illustrated in FIG. 4, the CDM encoder 16 is configured to perform CDM only on the mixer outputs $f_{i,2}$ to $f_{i,P}$, which are used for noise sensing. In one or more embodiments, the mixer outputs $f_{1,1}$ to $f_{Q,1}$, which comprises effective signal components in capacitive sensing, are not subjected to CDM.

In one or more embodiments, the analog front end 4 comprises AD converters $13_1$ to $13_Q$, and the mixer outputs $f_{1,1}$ to $f_{Q,1}$ outputted from the mixers $14_{1\_1}$ to $14_{Q\_1}$ are supplied to the AD converters $13_1$ to $13_Q$, respectively. In one or more embodiments, the AD converters $13_1$ to $13_Q$ are configured to perform AD conversion on the mixer outputs $f_{1,1}$ to $f_{Q,1}$ to output Q digital data streams. In one or more embodiments, the Q digital data streams are supplied to the digital filters $15_1$ to $15_Q$, respectively. In one or more embodiments, the digital filters $15_1$ to $15_Q$ are configured to perform digital filtering for extracting desired frequency components and thereby generate digital output signals Dout [1, 1] to Dout [Q, 1].

In one or more embodiments, the CDM encoder 16 comprises (P−1)×Q modulators $19_1$ to $19_{(P-1)Q}$ and a superimposer 20. In one or more embodiments, the modulator $19_1$ to $19_{(P-1)Q}$ are configured to modulate those of the mixer outputs $f_{1,1}$ to $f_{Q,P}$ other than the mixer outputs $f_{1,1}$ to $f_{Q,1}$ by using codes d[1] to d[(P−1)Q]. In one or more embodiments, the codes d[1] to d[(P−1)Q] are orthogonal to each other. In one or more embodiments, the superimposer 20 is configured to generate a CDM signal g by adding the output signals of the modulators $19_1$ to $19_{(P-1)Q}$. In various embodiments, when the output signals of the modulators $19_1$ to $19_{(P-1)Q}$ are current signals, the addition of the output signals may be achieved through wired-OR. In this case, the outputs of the modulators $19_1$ to $19_{(P-1)Q}$ may be commonly connected to an input of the AD converter 17.

In one or more embodiments, the AD converter 17 is configured to perform AD conversion on the CDM signal g received from the superimposer 20 to output a digital data stream.

In one or more embodiments, the CDM decoder 18 is configured to decode the digital data stream received from the AD converter 17. In one or more embodiments, the CDM decoder 18 comprises (P−1)×Q digital filters $21_1$ to $21_{(P-1)Q}$ adapted to demodulation. In one or more embodiments, the (P−1)×Q digital filters $21_1$ to $21_{(P-1)Q}$ are configured to receive codes D[1] to D[(P−1)Q] corresponding to the codes d[1] to d[(P−1)Q], respectively. In one or more embodiments, the (P−1)×Q digital filters $21_1$ to $21_{(P-1)Q}$ are further configured to decode the digital data stream received from the AD converter 17 by using the codes D[1] to D[(P−1)Q], respectively, to generate digital output signals Dout [i, 2] to Dout [i, P], where i is any integer from one to Q.

In one or more embodiments, the processor 6 is configured to perform arithmetic processing for proximity sensing to detect an object proximate to the sensor array 1 on the digital output signals Dout [1, 1] to Dout [Q, P]. In one or more embodiments, the digital output signals Dout [1, 1] to Dout [Q, P] generated in the semiconductor device 2 illustrated in FIG. 4 are equivalent to those generated in the semiconductor device 2 illustrated in FIG. 1, except for distortion caused by the CDM. In one or more embodiments, the arithmetic processing for the proximity sensing is achieved by the semiconductor device 2 illustrated in FIG. 4, similarly to the semiconductor device 2 illustrated in FIG. 1.

In one or more embodiments, the configuration of the capacitive sensing system illustrated in FIG. 4 achieves noise sensing as well as obtainment of the effective signal component in the capacitive sensing. In one or more embodiments, the configuration illustrated in FIG. 4 effectively reduces the number of AD converters while preventing the effective signal components from being affected by distortion caused by the CDM. In one or more embodiments, the configuration illustrated in FIG. 4 effectively reduces the cost and improves the accuracy of the capacitive sensing.

In one or more embodiments, as illustrated in FIG. 5, the number Q of the sensing electrodes 3 used for capacitive sensing is an even number and the number P of the mixers 14 included in each mixer circuitry 12 is two. In one or more embodiments, the mixer outputs $f_{1,1}$ to $f_{Q,2}$ outputted from the mixer circuitries $12_1$ to $12_Q$ are subjected to CDM. In one or more embodiments, the CDM is performed for each pair of sensing signals $e_{2j-1}$ and $e_{2j}$ associated with the pair of the driver/receivers $11_{2j-1}$ and $11_{2j}$, where j is any integer from one to Q/2.

In one or more embodiments, each mixer circuitry $12_i$ comprises mixers $14_{i\_1}$ and $14_{i\_2}$. In one or more embodiments, the mixers $14_{i\_1}$ and $14_{i\_2}$ are configured to generate two mixer outputs $f_{i,1}$ and $f_{i,2}$ by modulating the sensing signal $e_i$ by using local carriers Mix1 and Mix2 which are orthogonal to each other, where i is any integer from one to Q. In one or more embodiments, the local carrier Mix1 supplied to the mixer $14_{i\_1}$ is an in-phase signal which is in phase with the drive signal supplied to the sensing electrode $3_i$ from the driver/receiver $11_i$, and the local carrier Mix2 supplied to the mixers $14_{i\_2}$ is an out-of-phase signal which has a phase different from that of the drive signal, for example, by 90°.

In one or more embodiments, the CDM encoder 16 comprises 2Q modulators $19_1$ to $19_{2Q}$ and Q superimposers $20_1$ to $20_Q$. In one or more embodiments, the modulators $19_1$ to $19_{2Q}$ are configured to modulate the mixer outputs $f_{1,1}$ to $f_{Q,2}$ with the codes d[1] to d[4]. In one or more embodiments, the codes d[1] and d[4] are orthogonal to each other, and the codes d[3] and d[2] are orthogonal to each other. In one or more embodiments, four modulators 19 are prepared for two mixer circuitries 12.

In one or more embodiments, the mixer output $f_{1,1}$ outputted from the mixer $14_{1\_1}$ of the mixer circuitry $12_1$ is supplied to the modulator $19_1$, and the mixer output $f_{1,2}$ outputted from the mixer $14_{1\_2}$ is supplied to the modulator $19_2$. In one or more embodiments, the mixer output $f_{2,1}$ outputted from the mixer $14_{2\_1}$ of the mixer circuitry $12_2$ is supplied to the modulator $19_3$, and the mixer output $f_{2,2}$ outputted from the mixer $14_{2\_2}$ is supplied to the modulator $19_4$.

In one or more embodiments, the modulator $19_1$ is configured to modulate the mixer output $f_{1,1}$ with the code d[1], and the modulator $19_2$ is configured to modulate the mixer output $f_{1,2}$ with the code d[2]. In one or more embodiments, the modulator $19_3$ is configured to modulate the mixer output $f_{2,1}$ with the code d[3], and the modulator $19_4$ is configured to modulate the mixer output $f_{2,2}$ with the code d[4].

In one or more embodiments, a similar applies to the rest. In one or more embodiments, the mixer output $f_{(2j-1),1}$ outputted from the mixer $14_{(2j-1)\_1}$ of the mixer circuitry $12_{(2j-1)}$ is supplied to the modulator $19_{4j-3}$, and the mixer output $f_{(2j-1),2}$ outputted from the mixer $14_{(2j-1)\_2}$ is supplied to the modulator $19_{(4j-2)}$, where j is an integer from one to Q/2. In one or more embodiments, the mixer output $f_{2j,1}$ outputted from the mixer $14_{2j\_1}$ of the mixer circuitry $12_{2j}$ is supplied to the modulator $19_{4j-1}$, and the mixer output $f_{2j,2}$ outputted from the mixer $14_{2j\_2}$ is supplied to the modulator $19_{4j}$.

In one or more embodiments, the modulator $19_{4j-3}$ is configured to modulate the mixer output $f_{(2j-1),1}$ with the code d[1], and the modulator $19_{4j-2}$ is configured to modulate the mixer output $f_{(2j-1)),2}$ with the code d[2]. In one or more embodiments, the modulator $19_{4j-1}$ is configured to modulate the mixer output $f_{2j,1}$ with the code d[3], and the modulator $19_{4j}$ is configured to modulate the mixer output $f_{2j,2}$ with the code d[4].

In one or more embodiments, the superimposer $20_{2j-1}$ is configured to generate a sum signal $h_{2j-1}$ by adding the modulated signal outputted from the modulator $19_{4j-3}$ and the modulated signal outputted from the modulator $19_{4j}$, and the superimposer $20_{2j}$ is configured to generate a sum signal $h_{2j}$ by adding the modulated signal outputted from the modulator $19_{4j-2}$ and the modulated signal outputted from the modulator $19_{4j-1}$. When the output signals of the modulators $19_{4j-3}$ and $19_{4j}$ are current signals, the addition of these output signals may be achieved by commonly connecting the outputs of the modulators $19_{4j-3}$ and $19_{4j}$ to the input of the AD converter $13_{2j-1}$. Similarly, when the output signals of the modulators $19_{4j-2}$ and $19_{4j-1}$ are current signals, the addition of these output signals may be achieved by commonly connecting the outputs of the modulators $19_{4j-2}$ and $19_{4j-1}$ to the input of the AD converter $13_{2j}$.

In one or more embodiments, the AD converters $13_{2j-1}$ is configured to perform AD conversion on the sum signal $h_{2j-1}$ received from the superimposer $20_{2j-1}$ to output a digital data stream, and the AD converters $13_{2j}$ is configured to perform AD conversion on the sum signal $h_{2j}$ received from the superimposer $20_{2j}$ to output another digital data stream.

In one or more embodiments, the CDM decoder 18 comprises 2Q digital filters $21_1$ to $21_{2Q}$ adapted to demodulation. In one or more embodiments, each of the digital filters $21_1$ to $21_{2Q}$ is supplied with one of the codes D[1] to D[4] corresponding to the codes d[1] to d[4], which are used for modulation in the corresponding modulators $19_1$ to $19_{2Q}$, and configured to perform the demodulation based on the codes supplied thereto.

In one or more embodiments, the digital filter $21_1$ is configured to generate the digital output signal Dout [1, 1] by decoding the digital data stream received from the AD converter $13_1$ by using the code D[1]. In one or more embodiments, the digital filter $21_2$ is configured to generate the digital output signal Dout [1, 2] by decoding the digital data stream received from the AD converter $13_2$ by using the code D[2].

In one or more embodiments, the digital filter $21_3$ is configured to generate the digital output signal Dout [2, 1] by decoding the digital data stream received from the AD converter $13_2$ by using the code D[3]. In one or more embodiments, the digital filter $21_4$ is configured to generate the digital output signal Dout [2, 2] by decoding the digital data stream received from the AD converter $13_1$ by using the code D[4].

In one or more embodiments, the digital filter $21_{4j-3}$ is configured to generate the digital output signal Dout [2j−1, 1] by decoding the digital data stream received from the AD converter $13_{2j-1}$ by using the code D[1]. In one or more embodiments, the digital filter $21_{4j-2}$ is configured to generate the digital output signal Dout [2j−1, 2] by decoding the digital data stream received from the AD converter $13_{2j}$ by using the code D[2].

In one or more embodiments, the digital filter $21_{4j-1}$ is configured to generate the digital output signal Dout [2j, 1] by decoding the digital data stream received from the AD converter $13_{2j}$ by using the code D[3]. In one or more embodiments, the digital filter $21_{4j}$ is configured to generate the digital output signal Dout [2j, 2] by decoding the digital data stream received from the AD converter $13_{2j-1}$ by using the code D[4].

In one or more embodiments, the processor 6 is configured to perform arithmetic processing on the digital output signals Dout [1, 1] to Dout [Q, 2] to perform proximity sensing to detect one or more objects proximate the sensor array 1. In one or more embodiments, the arithmetic processing for performing proximity sensing is achieved by the semiconductor device 2 illustrated in FIG. 5 in a similar way to the semiconductor device 2 illustrated in FIG. 1 with an assumption that P is two.

In one or more embodiments, the processor 6 is configured to perform proximity sensing to detect an object proximate to the sensor array 1, based on the digital output signals Dout [1, 1] to Dout [Q, 1], which correspond to effective signal components. In one or more embodiments, the processor 6 may sense the position at which an object approaches or is in contact with the sensor array 1, based on the digital output signals Dout [1, 1] to Dout [Q, 1].

In one or more embodiments, the processor 6 additionally performs noise sensing based on the digital output signals associated with noise components, that is, those of the digital output signals Dout [1, 2] to Dout [Q, 2]. In one or more embodiments, data associated with the digital output signal Dout [i, 1] obtained for a certain frame may be discarded when noise is sensed based on the digital output signals Dout [i, 2] to Dout [i, 2] in capacitive sensing for this frame. In one or more embodiments, the proximity sensing may be achieved based on the digital output signal Dout [1, 1] to Dout [Q, 1] for which no noise is sensed.

In one or more embodiments, the configuration illustrated in FIG. 5 achieves noise sensing as well as obtainment of the effective signal component in the capacitive sensing. Additionally, the configuration of the capacitive sensing system illustrated in FIG. 5 effectively suppresses an increase in the number of AD converters, in one or more embodiments. The configuration illustrated in FIG. 1 incorporates two AD converters 13 for one driver/receiver 11, whereas the configuration illustrated in FIG. 5 incorporates one AD converter 13 for one driver/receiver 11, and this effectively reduces the number of AD converters 13.

Furthermore, the configuration illustrated in FIG. 5 effectively reduces a loss of an effective signal component in one or more embodiments. In the configuration illustrated in FIG. 5, the signals generated in the CDM encoder 16 through the modulation of the plurality of mixer outputs $f_{i,1}$ and $f_{i,2}$, which are generated by the mixer circuitry $12_i$ from the sensing signal $e_i$, are supplied to different AD converters $13_{2i-1}$ and $13_{2i}$. This prevents the component corresponding to the sensing signal $e_i$ from being cancelled, effectively reducing a loss of an effective signal components.

Although various embodiments of the present disclosure have been specifically described, a skilled person would appreciate that the technologies described in this disclosure may be implemented with various modifications. For example, although embodiments in which self-capacitive sensing is performed have been described above, mutual capacitive sensing may be performed instead in one or more embodiments. In one or more embodiments, the sensor array 1 further comprises drive electrodes opposed to the sensing electrodes $3_1$ to $3_Q$, and the semiconductor device 2 further comprises drive circuitry configured to supply drive signals to the drive electrodes. In one or more embodiments, the driver/receivers 11 are replaced with receivers connected to the sensing electrodes $3_1$ to $3_Q$, and the receivers are configured to output sensing signals $e_1$ to $e_Q$ based on mutual capacitances formed between the drive electrodes and the sensing electrodes $3_1$ to $3_Q$. In this case, the local carrier Mix1 of the local carriers Mix1 to MixP used in the mixer circuitry 12 is in phase with the drive signals supplied to the drive electrodes, and the remaining local carriers Mix2 to MixP are out of phase, in one or more embodiments.

What is claimed is:

1. A semiconductor device, comprising:
    first mixer circuitry configured to generate a plurality of first mixer outputs through quadrature decomposition of a first sensing signal based on an in-phase local carrier and an out-of-phase local carrier, the first sensing signal corresponding to a capacitance of a first sensing electrode of a sensor array supplied with a drive signal, the in-phase local carrier being in phase with the drive signal, the out-of-phase local carrier having a phase different from that of the in-phase local carrier, and the plurality of first mixer outputs comprising:
        a first in-phase mixer output generated based on the in-phase local carrier and the first sensing signal; and
        a first out-of-phase mixer output generated based on the out-of-phase local carrier and the first sensing signal;
    a code division multiplexing (CDM) encoder configured to modulate the first out-of-phase mixer output to generate a first modulated signal; and
    a processor configured to perform proximity sensing of an object based on the first in-phase mixer output and noise sensing based on the first modulated signal.

2. The semiconductor device according to claim 1, wherein the CDM encoder is further configured to perform CDM on the plurality of first mixer outputs to generate a CDM signal, wherein the semiconductor device further comprises:
    an analog-digital (AD) converter configured to perform AD conversion on the CDM signal to generate a digital data stream; and
    a CDM decoder configured to decode the digital data stream to generate a plurality of digital output signals, and
    wherein the processor is configured to perform the proximity sensing and the noise sensing based on the plurality of digital output signals.

3. The semiconductor device according to claim 2, wherein the processor is configured to perform the proximity sensing based on a first digital output signal of the plurality of digital output signals and perform the noise sensing based on a second digital output signal of the plurality of digital output signals, the first digital output signal corresponding to the first in-phase mixer output, and the second digital output signal corresponding to the first out-of-phase mixer output.

4. The semiconductor device according to claim 1 further comprising: second mixer circuitry configured to generate a plurality of second mixer outputs through quadrature decomposition of a second sensing signal based on the in-phase local carrier and the out-of-phase local carrier, the second sensing signal corresponding to a capacitance of a second sensing electrode of the sensor array, and the plurality of second mixer outputs comprising:
    a second in-phase mixer output generated based on the in-phase local carrier and the second sensing signal; and
    a second out-of-phase mixer output generated based on the out-of-phase local carrier and the second sensing signal, and
    wherein the processor is configured to perform the proximity sensing based on the first and second in-phase mixer outputs and the noise sensing based on the first modulated signal and the second out-of-phase mixer output.

5. The semiconductor device according to claim 4, wherein the CDM encoder is configured to perform CDM on the plurality of first mixer outputs and the plurality of second mixer outputs to generate a CDM signal, wherein the semiconductor device further comprises:
    an AD converter configured to perform AD conversion on the CDM signal to generate a digital data stream; and
    a CDM decoder configured to decode the digital data stream received from the AD converter to generate a plurality of digital output signals, and
    wherein the processor is configured to perform the proximity sensing and the noise sensing based on the plurality of digital output signals.

6. The semiconductor device according to claim 5, wherein the plurality of digital output signals comprises:
    a first digital output signal corresponding to the first in-phase mixer output;
    a second digital output signal corresponding to the second in-phase mixer output;
    a third digital output signal corresponding to the first out-of-phase mixer output; and
    a fourth digital output signal corresponding to the second out-of-phase mixer output, and wherein the processor is configured to perform the proximity sensing based on the first digital output signal and the second digital output signal and perform the noise sensing based on the third digital output signal and the fourth digital output signal.

7. The semiconductor device according to claim 4, wherein the CDM encoder is further configured to perform CDM on the second out-of-phase mixer output to generate a second modulated signal and generate a CDM signal from the first and second modulated signals, wherein the semiconductor device further comprises:
  a first AD converter configured to perform AD conversion on the first in-phase mixer output to generate a first digital data stream;
  a second AD converter configured to perform AD conversion on the second in-phase mixer output to generate a second digital data stream; and
  a third AD converter configured to perform AD conversion on the CDM signal to generate a third digital data stream, and
  wherein the processor is configured to perform the proximity sensing based on the first and second digital data streams and perform the noise sensing based on the third digital data stream.

8. The semiconductor device according to claim 7, further comprising a CDM decoder configured to decode the third digital data stream to generate a plurality of digital output signals,
  wherein the plurality of digital output signals comprises:
    a first digital output signal corresponding to the first out-of-phase mixer output; and
    a second digital output signal corresponding to the second out-of-phase mixer output, and
  wherein the processor is configured to sense noise in the first sensing signal based on the first digital output signal and sense noise in the second sensing signal based on the second digital output signal.

9. The semiconductor device according to claim 4 further comprising:
  a first modulator configured to modulate the first in-phase mixer output with a first code to generate a second modulated signal;
  a second modulator configured to modulate the first out-of-phase mixer output with a second code to generate the first modulated signal;
  a third modulator configured to modulate the second in-phase mixer output with a third code to generate a third modulated signal;
  a fourth modulator configured to modulate the second out-of-phase mixer output with a fourth code to generate a fourth modulated signal;
  a first AD converter configured to perform AD conversion on a first sum signal obtained by adding the second modulated signal and the fourth modulated signal generating a first digital data stream; and
  a second AD converter configured to perform AD conversion on a second sum signal obtained by adding the first modulated signal and the third modulated signal generating a second digital data stream,
  wherein the processor is configured to perform the proximity sensing and the noise sensing based on the first digital data stream and the second digital data stream,
  wherein the first code and the fourth code are orthogonal to each other, and
  wherein the second code and the third code are orthogonal to each other.

10. The semiconductor device according to claim 9 further comprising:
  a first demodulator configured to demodulate the first digital data stream with a code corresponding to the first code to generate a first digital output signal;
  a second demodulator configured to demodulate the second digital data stream with a code corresponding to the second code to generate a second digital output signal;
  a third demodulator configured to demodulate the second digital data stream with a code corresponding to the third code to generate a third digital output signal; and
  a fourth demodulator configured to demodulate the first digital data stream with a code corresponding to the fourth code to generate a fourth digital output signal.

11. The semiconductor device according to claim 10, wherein the processor is configured to perform the proximity sensing based on the first digital output signal and the third digital output signal.

12. The semiconductor device according to claim 10, wherein the processor is configured to perform the noise sensing based on the second digital output signal and the fourth digital output signal.

13. A capacitive sensing system, comprising:
  a sensor array comprising a first sensing electrode;
  first mixer circuitry configured to generate a plurality of first mixer outputs through quadrature decomposition of a first sensing signal based on an in-phase local carrier and an out-of-phase local carrier, the first sensing signal corresponding to a capacitance of the first sensing electrode supplied with a drive signal, the in-phase local carrier being in phase with the drive signal, the out-of-phase local carrier having a phase different from that of the in-phase local carrier, and the plurality of first mixer outputs comprising:
    a first in-phase mixer output generated based on the in-phase local carrier and the first sensing signal; and
    a first out-of-phase mixer output generated based on the out-of-phase local carrier and the first sensing signal;
  a code division multiplexing (CDM) encoder configured to modulate the first out-of-phase mixer output to generate a first modulated signal; and
  a processor configured to perform proximity sensing of an object based on the first in-phase mixer output and noise sensing based on the first modulated signal.

14. The capacitive sensing system according to claim 13, wherein the sensor array is integrated in a display panel.

15. A method, comprising:
  generating a plurality of first mixer outputs through quadrature decomposition of a first sensing signal based on an in-phase local carrier and an out-of-phase local carrier, the first sensing signal corresponding to a capacitance of a first sensing electrode supplied with a drive signal, the in-phase local carrier being in phase with the drive signal, and the out-of-phase local carrier having a phase different from that of the in-phase local carrier,
  wherein the plurality of first mixer outputs comprises:
    a first in-phase mixer output generated based on the in-phase local carrier and the first sensing signal; and
    a first out-of-phase mixer output generated based on the out-of-phase local carrier and the first sensing signal;
  performing code division multiplexing (CDM) on the first out-of-phase mixer output by modulating the first out-of-phase mixer output to generate a first modulated signal;

performing proximity sensing of an object based on the first in-phase mixer output; and performing noise sensing based on the first modulated signal.

16. The method according to claim 15, further comprising:

generating a plurality of second mixer outputs through quadrature decomposition of a second sensing signal based on the in-phase local carrier and the out-of-phase local carrier, the second sensing signal corresponding to a capacitance of a second sensing electrode, wherein the plurality of second mixer outputs comprises:
 a second in-phase mixer output generated based on the in-phase local carrier and the second sensing signal; and
 a second out-of-phase mixer output generated based on the out-of-phase local carrier and the second sensing signal, wherein performing the proximity sensing comprises performing the proximity sensing based on the first in-phase mixer output and the second in-phase mixer output, and wherein performing the noise sensing comprises performing the noise sensing based on the first modulated signal and the second out-of-phase mixer output.

17. The method according to claim 16, further comprising:

generating a CDM signal by performing CDM on the plurality of first mixer outputs and the plurality of second mixer outputs;

performing AD conversion on the CDM signal to generate a digital data stream; and decoding the digital data stream to generate a plurality of digital output signals.

18. The method according to claim 17, wherein the plurality of digital output signals comprises:

a first digital output signal corresponding to the first in-phase mixer output;

a second digital output signal corresponding to the second in-phase mixer output;

a third digital output signal corresponding to the first out-of-phase mixer output; and a fourth digital output signal corresponding to the second out-of-phase mixer output, wherein performing the proximity sensing comprises performing the proximity sensing based on the first digital output signal and the second digital output signal, and wherein performing the noise sensing comprises performing the noise sensing based on the third digital output signal and the fourth digital output signal.

19. The method according to claim 16, wherein performing the proximity sensing comprises:

performing AD conversion on the first in-phase mixer output to generate a first digital data stream;

performing AD conversion on the second in-phase mixer output to generate a second digital data stream; and performing the proximity sensing based on the first digital data stream and the second digital data stream, and wherein performing the noise sensing comprises:
 performing CDM on the second out-of-phase mixer output to generate a second modulated signal and generate a CDM signal from the first modulated signal and the second modulated signal;
 performing AD conversion on the CDM signal to generate a third digital data stream; and
 performing the noise sensing based on the third digital data stream.

20. The method according to claim 16, further comprising:

modulating the first in-phase mixer output with a first code to generate a second modulated signal;

modulating the first out-of-phase mixer output with a second code to generate the first modulated signal;

modulating the second in-phase mixer output with a third code to generate a third modulated signal;

modulating the second out-of-phase mixer output with a fourth code to generate a fourth modulated signal;

performing AD conversion on a first sum signal obtained by adding the second modulated signal and the fourth modulated signal; and performing AD conversion on a second sum signal obtained by adding the first modulated signal and the third modulated signal, wherein the first code and the fourth code are orthogonal to each other, and wherein the second code and the third code are orthogonal to each other.

* * * * *